(12) United States Patent
Giansante et al.

(10) Patent No.: US 11,794,196 B2
(45) Date of Patent: Oct. 24, 2023

(54) SYSTEMS AND METHODS FOR REMOVING CONTAMINANTS FROM SURFACES OF SOLID MATERIAL

(71) Applicant: Kyata Capital Inc., Burlington (CA)

(72) Inventors: Filippo Giansante, Hamilton (CA); Antonio Serafino Mancina, Tecumseh (CA)

(73) Assignee: Kyata Capital Inc., Burlington (CA)

( * ) Notice: Subject to any disclaimer, the term of this patent is extended or adjusted under 35 U.S.C. 154(b) by 0 days.

(21) Appl. No.: 17/701,929

(22) Filed: Mar. 23, 2022

(65) Prior Publication Data

US 2022/0314240 A1 Oct. 6, 2022

Related U.S. Application Data

(60) Provisional application No. 63/167,670, filed on Mar. 30, 2021.

(51) Int. Cl.
| | | |
|---|---|---|
| *B04C 3/06* | (2006.01) | |
| *B04C 3/02* | (2006.01) | |
| *B04C 7/00* | (2006.01) | |
| B04C 3/00 | (2006.01) | |
| B04C 9/00 | (2006.01) | |

(52) U.S. Cl.
CPC ............ *B04C 3/06* (2013.01); *B04C 3/02* (2013.01); *B04C 7/00* (2013.01); *B04C 2003/006* (2013.01); *B04C 2009/008* (2013.01)

(58) Field of Classification Search
CPC .... B04C 3/06; B04C 3/02; B04C 7/00; B04C 2003/006; B04C 2009/008; B01D 17/0217; B08B 3/04; B08B 5/00; B08B 3/14
See application file for complete search history.

(56) References Cited

U.S. PATENT DOCUMENTS

| | | | | |
|---|---|---|---|---|
| 4,353,798 A | * | 10/1982 | Foss ................... | B01D 17/0217 208/262.5 |
| 4,960,525 A | * | 10/1990 | Dalby ................... | B01D 21/34 209/729 |
| 5,069,751 A | * | 12/1991 | Chamblee ............ | B03D 1/1425 210/512.1 |
| 5,131,980 A | * | 7/1992 | Chamblee .............. | B03D 1/247 162/4 |

(Continued)

FOREIGN PATENT DOCUMENTS

| | | |
|---|---|---|
| JP | 5945349 B2 | 7/2016 |
| WO | 2018069342 A1 | 4/2018 |

*Primary Examiner* — Dung H Bui
(74) *Attorney, Agent, or Firm* — Marks & Clerk; Paul Horbal

(57) ABSTRACT

Systems and methods for removing contaminants from surfaces of a solid material using a flow of compressible fluid to draw incompressible fluid through pathways between fragments of the solid material. At least one method includes introducing solid material into a processing chamber, concurrently directing compressible fluid and incompressible fluid into the processing chamber via the inlet fluid distribution manifold, and operating a vacuum pump to maintain a pressure at a discharge outlet of the processing chamber sufficient to promote the compressible and incompressible fluids each achieving a velocity of at least 10 meters per second within the processing chamber.

15 Claims, 4 Drawing Sheets

(56) References Cited

U.S. PATENT DOCUMENTS

| | | | |
|---|---|---|---|
| 5,180,486 A * | 1/1993 | Smolensky | B01D 45/12 210/512.1 |
| 5,281,245 A * | 1/1994 | Yang | B04C 9/00 417/151 |
| 5,591,253 A * | 1/1997 | Altman | B04C 5/04 96/61 |
| 5,711,820 A | 1/1998 | Smith et al. | |
| 5,759,209 A | 6/1998 | Adler et al. | |
| 6,202,576 B1 * | 3/2001 | Nagl | B04C 9/00 406/173 |
| 6,212,916 B1 | 4/2001 | Carr | |
| 6,312,528 B1 * | 11/2001 | Summerfield | C09K 3/32 134/40 |
| 6,418,942 B1 | 7/2002 | Gray et al. | |
| 6,420,517 B1 * | 7/2002 | van Gool | B01D 17/0211 528/502 R |
| 6,783,601 B2 | 8/2004 | Gray et al. | |
| 6,820,350 B1 * | 11/2004 | Eriksson | B27N 1/00 34/316 |
| 2002/0178703 A1 * | 12/2002 | Ribera Salcedo | B04C 7/00 55/459.1 |
| 2004/0231514 A1 * | 11/2004 | Nagi | B04C 5/00 95/271 |
| 2005/0252837 A1 * | 11/2005 | Haland | B01D 45/12 210/194 |
| 2011/0048458 A1 * | 3/2011 | Takahashi | B08B 3/14 134/104.4 |
| 2011/0192771 A1 * | 8/2011 | Mori | B04C 5/185 210/128 |
| 2011/0247661 A1 | 10/2011 | Hayashida et al. | |
| 2012/0067214 A1 * | 3/2012 | Ribera Salcedo | B03C 3/49 96/57 |
| 2012/0124948 A1 * | 5/2012 | Nagasawa | B01D 45/16 55/340 |
| 2013/0092619 A1 * | 4/2013 | Bagnoli | E21B 21/068 210/324 |
| 2014/0215903 A1 * | 8/2014 | Doig | C10L 1/10 554/207 |
| 2016/0243487 A1 * | 8/2016 | Kim | A23F 5/04 |
| 2016/0341024 A1 * | 11/2016 | Un | B01D 17/0208 |
| 2016/0341025 A1 * | 11/2016 | Bjartnes | B01D 19/0068 |
| 2018/0050348 A1 * | 2/2018 | Whitney | B04C 9/00 |
| 2018/0318748 A1 * | 11/2018 | Kim | B01D 45/12 |
| 2019/0060918 A1 * | 2/2019 | Boltersdorf | B04C 5/04 |
| 2019/0184087 A1 * | 6/2019 | Radwanski | B01D 17/0217 |
| 2019/0233959 A1 * | 8/2019 | Ernt | C25C 1/02 |
| 2019/0271143 A1 * | 9/2019 | Iwasaki-Higbee | B01D 21/262 |
| 2019/0381423 A1 * | 12/2019 | Collins | B01D 53/265 |
| 2020/0216776 A1 * | 7/2020 | Hentges | C11B 9/02 |
| 2020/0238198 A1 * | 7/2020 | Li | B01D 17/0205 |
| 2021/0170454 A1 * | 6/2021 | Iwasaki-Higbee | E03F 9/00 |

\* cited by examiner

SYSTEMS AND METHODS FOR REMOVING CONTAMINANTS FROM SURFACES OF SOLID MATERIAL

CROSS-REFERENCE TO RELATED APPLICATION

This application claims the benefit of U.S. Provisional Patent Application No. 63/167,670, filed Mar. 30, 2021, the entire contents of which are incorporated herein by this reference.

FIELD

This disclosure relates generally to removing contaminants (e.g. liquid contaminants and/or loosely affixed particulate matter) from surfaces of solid material, and more specifically to systems and methods that include using a flow of compressible fluid to draw incompressible fluid through pathways between fragments of the solid material.

INTRODUCTION

In some known systems for removing contaminants, surfaces of a solid material may be subjected to one or more jets of fluid to loosen and/or remove contaminants. For example, U.S. Pat. No. 6,783,601 describes their system as providing for a means of impacting a jet of fluid on a surface for the purpose of mechanically scrubbing the surface of particles and other insoluble foreign residue, after an environment is created which is either free or substantially reduced of fluids normally encountered at ambient conditions. As another example, U.S. Patent Publication No. 2011/0247661 A1 discloses cleaning an object by injecting through a nozzle a multiphase fluid, containing steam in a continuous phase and water droplets in a dispersed phase.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

Systems and methods disclosed herein may be used to remove contaminants (e.g. normally hazardous materials) from solid material, resulting in 'clean' solid material (e.g. suitable for subsequent recycling). The solid material may include a mixture of materials, or may be homogeneous in nature. Contaminants that may be removed include or loosely affixed particulate matter, and liquid contaminants such as oils, glycols, etc. In some cases, the removal of contaminants generates one or more clean recyclable material streams.

In methods disclosed herein, solid material to be cleaned is placed in a chamber, and at least one compressible fluid and at least one incompressible fluid are concurrently introduced to the chamber while an outlet of the chamber is in fluid communication with a vacuum or other source of negative pressure. The pressure differential in the chamber induces the compressible and incompressible fluids to enter the chamber at relatively high velocities (e.g. about 10 m/s or greater). The high-speed flow of compressible fluid may 'pull' or 'draw' the incompressible fluid across the surfaces of the solid material—including exterior and interior surfaces of the solid material fragments—at sufficient local velocities to mechanically dislodge contaminants (liquid or solid) from the surfaces. The dislodged contaminants may be removed from the fluid stream that exits the chamber.

The disclosed systems and methods may have a number of practical applications, particularly for solid material that may be characterized as being difficult and/or cost-effective to clean, e.g. due to the physical nature of the material and/or the contaminants. For example, some material may have one or more internal passages that are considered difficult to penetrate with conventional cleaning techniques and materials (e.g. power washers, surfactants, and the like). In some cases, cleaning the solid material using known techniques may result in the creation of one or more hazardous waste streams.

Systems and methods disclosed herein may be particularly useful for removing contaminants from oil-rich media, such as used plastic or metal oil containers. Another particular application for the systems and methods disclosed herein may be removing contaminants from used oil filters (e.g. vehicle oil filters).

In accordance with one broad aspect of this disclosure, there is provided a system for removing contaminants from surfaces of a solid material, the system comprising: a processing enclosure defining a processing chamber, the processing enclosure including an inlet fluid distribution manifold and a discharge outlet; a cyclonic separation stage configured to remove compressible fluid from a discharge stream obtained from the processing chamber; a primary discharge flow path extending from the discharge outlet of the processing enclosure to the cyclonic separation stage; a first return flow path extending from the cyclonic separation stage to the inlet fluid distribution manifold; a vacuum pump positioned in the first return flow path between a compressible fluid outlet of the cyclonic separation stage and the inlet fluid distribution manifold; a first centrifugal separation stage configured to remove insoluble solids from a discharge stream obtained from the cyclonic separation stage; a secondary discharge flow path extending from the first centrifugal separation stage to the centrifugal separation stage; a second centrifugal separation stage configured to remove incompressible fluid from a discharge stream obtained from the first centrifugal separation stage; a tertiary discharge flow path extending from the first centrifugal separation stage to the second centrifugal separation stage; and a second return flow path extending from the second centrifugal separation stage to the inlet fluid distribution manifold.

In some embodiments, the system further comprises a heat source configured to transfer thermal energy to compressible fluid flowing through the first return flow path downstream of the vacuum pump.

In some embodiments, the heat source comprises at least one of a coil heat exchanger and a shell and tube heat exchanger.

In some embodiments, the vacuum pump comprises at least one vacuum turbine.

In some embodiments, the system further comprises a discharge manifold positioned between the processing chamber and the discharge outlet.

In some embodiments, at least one wall of the processing enclosure that defines the processing chamber is collapsible, such that the volume of the processing chamber may be varied.

In some embodiments, the system further comprises at least one barrier positioned within the processing chamber to inhibit or prevent motion of the solid material.

In some embodiments, the at least one barrier comprises at least one classifier.

In some embodiments, the inlet fluid distribution manifold comprises a plurality of compressible fluid discharge points and a plurality of incompressible fluid discharge points.

In some embodiments, the plurality of compressible fluid discharge points comprise compressible fluid valves.

In some embodiments, the plurality of compressible fluid discharge points comprise compressible fluid diffusers.

In some embodiments, the plurality of incompressible fluid discharge points comprise incompressible fluid valves.

In some embodiments, the plurality of incompressible fluid discharge points comprise incompressible fluid diffusers.

In some embodiments, the inlet fluid distribution manifold further comprises one or more vanes to direct compressible fluid entering the processing chamber.

In some embodiments, the inlet fluid distribution manifold further comprises one or more vanes to direct incompressible fluid entering the processing chamber.

In accordance with another broad aspect of this disclosure, there is provided a method for removing contaminants from surfaces of a solid material using a system comprising a processing chamber having an inlet fluid distribution manifold and a discharge outlet, a cyclonic separation stage, a vacuum pump, a first centrifugal separation stage, and a second centrifugal separation stage, the method comprising: introducing the solid material into the processing chamber; concurrently directing compressible fluid and incompressible fluid into the processing chamber via the inlet fluid distribution manifold; conveying a discharge stream from the processing chamber to the cyclonic separation stage along a primary discharge flow path; removing compressible fluid from the discharge stream from the processing chamber in the cyclonic separation stage; operating the vacuum pump to direct the removed compressible fluid to the inlet fluid distribution manifold along a first return flow path; conveying a discharge stream from the cyclonic separation stage to the first centrifugal separation stage along a secondary discharge flow path; removing insoluble solids from the discharge stream from the cyclonic separation stage in the first centrifugal separation stage; conveying a discharge stream from the first centrifugal separation stage to the second centrifugal separation stage along a tertiary discharge flow path; removing incompressible fluid from the discharge stream from the first centrifugal separation stage in the second centrifugal separation stage; and directing the removed incompressible fluid to the inlet fluid distribution manifold along a second return flow path.

In some embodiments, the contaminants comprise recoverable oil, and further comprising: removing the recoverable oil from the second centrifugal separation stage.

In some embodiments, the method further comprises: operating the vacuum pump to maintain a pressure at the discharge outlet of the processing chamber sufficient to promote the compressible and incompressible fluids each achieving a velocity of at least 10 meters per second within the processing chamber.

In some embodiments, the compressible fluid comprises at least one of nitrogen gas, oxygen gas, and carbon dioxide gas.

In some embodiments, the compressible fluid comprises air.

In some embodiments, the compressible fluid further comprises one or more treatment additives.

In some embodiments, the incompressible fluid comprises petroleum-based fluids, glycol, alcohols, water.

In some embodiments, the incompressible fluid further comprises one or more treatment additives.

In some embodiments, compressible fluid directed into the processing chamber exits the inlet fluid distribution manifold at a velocity of at least 10 meters per second.

In some embodiments, incompressible fluid directed into the processing chamber exits the inlet fluid distribution manifold at a velocity of at least 10 meters per second.

In some embodiments, the method further comprises: prior to the introducing, pre-treating the solid material.

In some embodiments, pre-treating the solid material comprises reducing an average particle size of the solid material.

In some embodiments, the solid material comprises used oil filters or fragments thereof, and the contaminants comprise recoverable oil.

In some embodiments, the solid material comprises used oil containers or fragments thereof, and the contaminants comprise recoverable oil.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
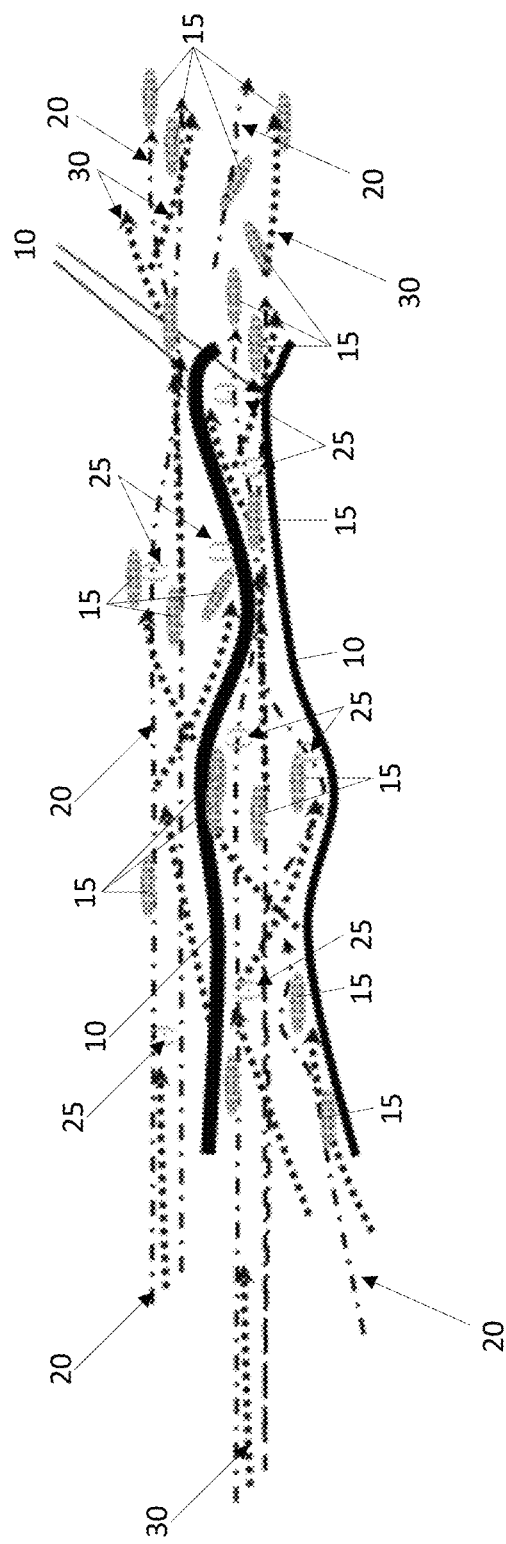
FIG. 1 is a simplified schematic diagram of contaminant separation from surfaces of a solid material.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

While the systems and methods disclosed herein are described specifically in relation to and in use with removing contaminants from post-use solid materials (e.g. oil containers, used oil filters) it will be appreciated that the apparatus and methods may alternatively be used with other types of solid material.

For example, systems and methods disclosed herein may be used to treat surfaces of solid material, such as applying a surface treatment and/or a coating to the surfaces of the solid material. This may be advantageous where the solid material to be treated includes a number of internal passages and/or comprises a number of small fragments with complicated pathways between them, and the surface treatment requires significant penetration of fluidized material into and/or around the solid material.

As used herein, a contaminant may be characterized as substance or mixture of substances, including both fluid(s) and solid particulate that is targeted for removal or separation from the solid material. As used herein, solid material may refer to solid matter that is mixed or homogeneous in nature.

In the example systems and methods of the present application, solid material that has one or more surface contaminants (which may be characterized as contaminated solid material) is placed into an enclosure, and the pressure within the enclosure is lowered to induce or 'draw' a flow of fluids through the enclosure and across the surfaces of the contaminated solid material. Specifically, the fluids entering the enclosure include at least one compressible fluid and at least one incompressible fluid, and the compressible and incompressible fluids enter the enclosure concurrently.

Examples of suitable compressible fluids $F_C$ that may be used, on their own or as part of a mixture of compressible fluids include ambient air, nitrogen gas, oxygen gas, carbon dioxide gas, etc. The compressible fluid(s) may be selected based on properties of the solid material and/or contaminant(s) to be removed. For example, if the contaminants include flammable substances, the compressible fluid(s) may not include oxygen.

Examples of suitable incompressible fluids $F_{in}$ that may be used include water, alcohol(s), glycol, oil, other petroleum-based fluids, etc. For the purposes of this application, a liquid, a sludge, and/or a slurry may be characterized as an incompressible fluid.

In some applications, one or more treatment additives may be mixed with the compressible fluid(s) and/or with the incompressible fluid(s). Examples of treatment additives include solvents, dispersants, detergents, and anti-foaming agents.

In some applications, one or more compressible fluid(s) in a mixture of compressible fluids may be characterized as a treatment additive. For example, one or more non-combustible compressible fluids (e.g. nitrogen gas, carbon dioxide gas) may be added to one or more combustible compressible fluids (e.g. oxygen gas) at a sufficient concentration to reduce the combustibility of the overall mixture of compressible fluids. As another example, one or more compressible fluids may be included in the overall mixture of compressible fluids in order to act as a carrier for another treatment additive (e.g. a dispersants, detergents, or anti-foaming agent). In these examples, the non-combustible compressible fluid(s) may be characterized both as a treatment additive and as a compressible fluid.

FIG. 1 illustrates a schematic example of interactions between the solid material, the surface contaminant(s) to be removed, and the compressible and incompressible fluid flows that may occur within systems and methods disclosed herein. With reference to FIG. 1, fragments of solid material 10 are illustrated along with surface contaminant(s), shown as contaminant particles 15. Also illustrated are streamlines or flow lines 20 (shown as dash-dot lines), representing the flow of at least one compressible fluid, and streamlines or flow lines 30 (shown as dashed lines), representing the flow of at least one incompressible fluid.

As used herein, streamlines or flow lines 20, 30 may be characterized as fluid flow paths within the solid material, the flow paths having an inlet, an outlet, and a cross-sectional area (which may vary along its length, e.g. due to contours of exterior and/or interior surfaces of the solid material 10). It will be appreciated that there may be a large number of streamlines through the solid material in the enclosure, particularly where the solid material includes a large number of fragments, and/or relatively small fragments.

In operation, the enclosure is in fluid communication with a vacuum source to lower the pressure at an outlet of the enclosure. The resulting reduced outlet pressure induces (alternatively characterized as 'drawing' or 'pulling') one or more compressible fluid(s) through an inlet to the enclosure, through the enclosure, and through the outlet of the enclosure. While passing through the enclosure, the compressible fluid(s) may pass across/along/between surfaces of the solid material 10 positioned in the enclosure, and/or between surfaces of the solid material 10 and a wall of the enclosure.

The particular path 20 taken by a flow of compressible fluid(s) through the enclosure may be characterized herein as streamlines or flow lines between and/or around the surfaces of the solid material. It will be appreciated that the streamlines 20 may be transient, and the number, position, and local velocity of such streamlines 20 will vary continuously as compressible fluid(s) are drawn across/along/between surfaces of the solid material 10, and/or between surfaces of the solid material 10 and a wall of the enclosure.

The reduction in outlet pressure resulting from the vacuum source is preferably large enough to induce the compressible fluid(s) to travel at relatively high speeds. For example, compressible fluid(s) may travel through the chamber at a velocity of at least 10 meters per second. Optionally, the reduction in outlet pressure may be sufficient to induce compressible fluid(s) to travel through the chamber at (local) supersonic velocities.

The velocity (e.g. supersonic) of the compressible fluid(s) is thought to create a drag condition or negative pressure upstream of incompressible fluid(s) entering the chamber concurrently with the compressible fluid(s), which results in the compressible fluid flow 'pulling' incompressible fluid(s)

along streamlines or flow lines 30, which may be the same or similar to the streamlines 20 of the compressible fluid(s). It will be appreciated that the streamlines 30 may be transient, and the number, position, and local velocity of such streamlines 30 will vary continuously as incompressible fluid(s) are drawn across/along/between surfaces of the solid material 10.

For example, for streamlines that exist between surfaces of the solid material (and/or inner walls of the enclosure), compressible fluid(s) traveling at elevated (e.g. supersonic) velocities may create a relatively low pressure region along its flowpath. With reference to FIG. 1, local low-pressure 'pockets' 25 are illustrated along streamlines or flow lines 20. It will be appreciated that the 'pockets' 25 are likely to be transient, and the number, position, and local pressure of such 'pockets' 25 will vary continuously as compressible fluid(s) are drawn across/along/between surfaces of the solid material 10.

As a result of the relatively low local pressure (e.g. local low-pressure 'pockets' 25) resulting from compressible fluid(s) traveling at elevated (e.g. supersonic) velocities, incompressible fluid(s) may be locally induced to flow through the same (or similar) streamlines at elevated (e.g. sonic) velocities. For example, incompressible fluid(s) may travel within the chamber at a velocity of at least 10 meters per second. Optionally, incompressible fluid(s) may be induced to travel at (local) supersonic velocities.

Presuming that the compressible fluid(s) can be characterized as having little or no viscosity (i.e. considered inviscid), the compressible fluid(s) may be induced to flow along relatively complex streamlines between or within the solid material. However, the incompressible fluid(s) may be characterized as having a non-negligible viscosity, and may resist being maneuvered along relatively complex streamlines between or within the solid material. As a result, skin friction may occur between surfaces of the solid material (and/or contaminants located thereon) and the incompressible fluid(s), causing a mechanical effect on the solid surfaces (and/or contaminants located thereon). This high impact mechanical effect may dislodge contaminants from the surfaces of the solid material.

Also, since the incompressible fluid may resist flow when in contact with a solid surface, on a minute level, the velocity of the incompressible fluid(s) may rapidly decrease (e.g. come to rest) upon contact with a solid surface. Since the compressible fluid(s) and incompressible fluid(s) may be mixed in a turbulent flow, the compressible fluid(s) may continue to re-create a local negative pressure or 'drag' effect that may accelerate and continue to 'pull' incompressible fluid(s) throughout the network of streamlines. This may result in a continuous or near-continuous local 'pounding' effect as incompressible fluid(s) repeatedly contact solid surfaces (and/or contaminants located thereon) at a relatively high velocity, and are repeatedly accelerated back to a relatively high velocity by the compressible fluid flow.

Accordingly, systems and methods of the present application may be characterized as separating liquid and/or solid contaminants from surfaces of a solid material by creating local skin friction effects due to incompressible fluid(s) impacting surfaces of the solid material at relatively high velocities. The relatively high velocities of the incompressible fluid(s) may be induced by creating localized negative pressure environments along the streamlines of compressible fluid flow along and through the solid material. For example, if the compressible fluid(s) reached (local) supersonic velocities, a sonic shock wave may be created upstream of compressible fluid(s) flowing along and through the solid material, and the sonic shock wave may result in a significant local acceleration of the compressible fluid(s).

As noted earlier, some known systems involve expelling, jetting, or spraying a fluid mixture onto solid material to create a high initial impact velocity between the fluid mixture and the solid material. For example, a pressurized fluid mixture may be directed through a nozzle, as in a typical power washer. In contrast, systems and methods disclosed herein use a reduced or negative pressure environment to promote the flow of fluids (compressible and incompressible) through one or more non-linear passages (e.g. streamlines) of the solid material.

Figure 2:
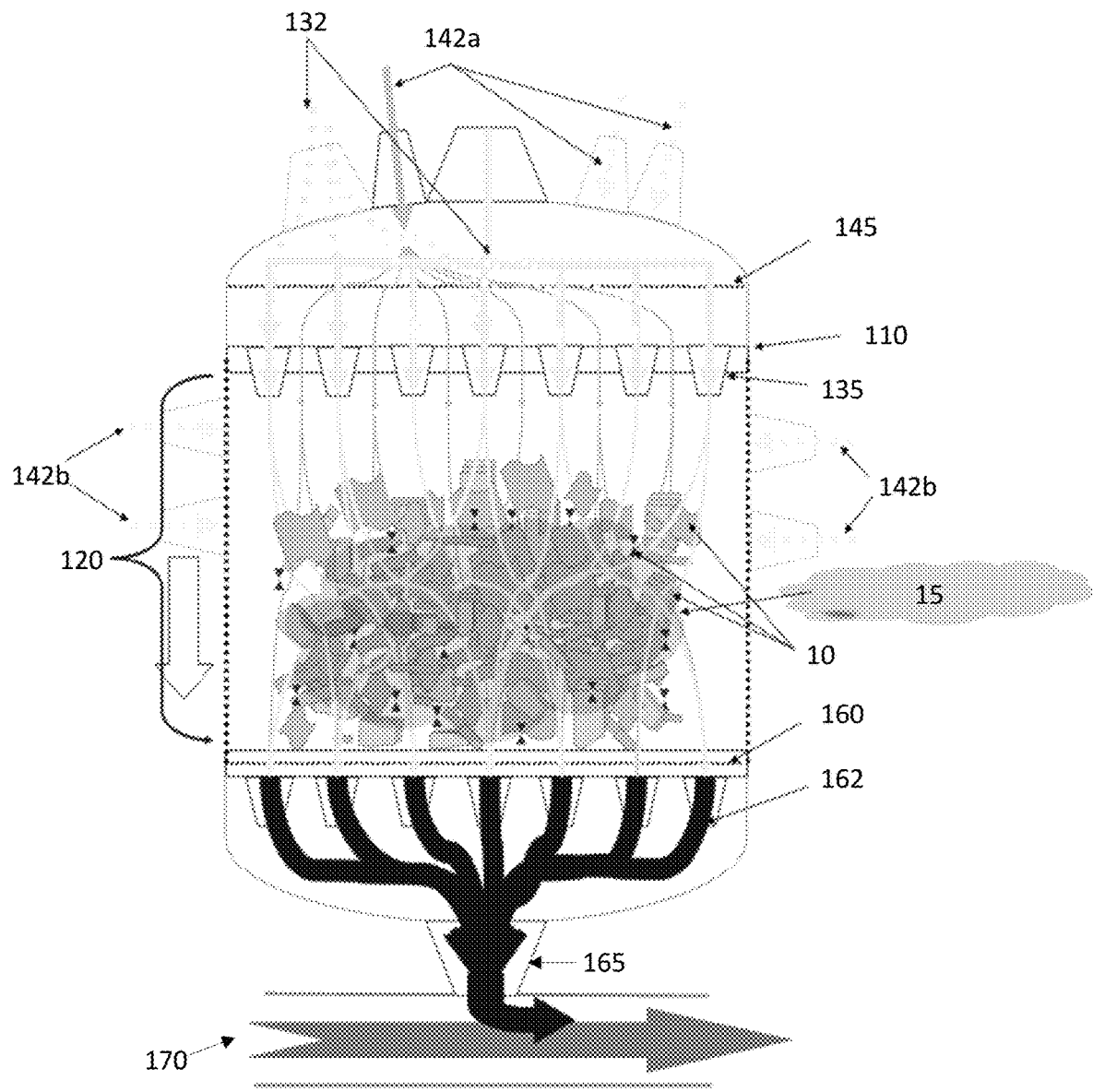
FIG. 2 is a schematic diagram of a generalized system and process flow for removing contaminants from surfaces of a solid material.

FIG. 2 illustrates a schematic example of an enclosure, referred to generally as 110. Enclosure 110 includes a processing chamber 120, which may be characterized as a volume within enclosure 110 in which solid material 10 to be processed (e.g. contaminated material) is positioned.

Enclosure 110 is configured to promote the generation of a low pressure environment within processing chamber 120. Enclosure 110 may have a generally regular shape (e.g., a cylinder, ellipse, a sphere, etc.), or it may have an irregular shape (e.g. a machine component or part that requires treatment of internal surfaces). Preferably, enclosure 110 has a generally cylindrical shape.

Enclosure 110 may be substantially rigid, such that the interior volume of processing chamber 120 remains generally constant during operation. Alternatively, some or all of enclosure 110 may be configured to deflect, such that the interior volume of processing chamber 120 may vary during operation. For example, enclosure 110 may include a collapsible structure that encapsulates solid material 10 that is to be processed, such as an elastomeric bladder that has at least one inlet opening and at least one outlet opening.

In the illustrated example, a barrier 160 is provided at a downstream or lower end of the processing chamber 120 to support solid material 10 during processing. Barrier 160 may include, a screen, a classifier, or the like. Barrier 160 is configured to restrain or regulate the flow of solid material 10 contained in processing chamber 120, while permitting fluid flow through enclosure 110.

The enclosure 110 also includes a plurality of incompressible fluid inlets 132, through which one or more incompressible fluid(s) may be drawn into the processing chamber 120. The number and/or configuration of the incompressible fluid inlets 132 may be selected based on one or more characteristics of the solid material and/or contaminants to be removed. In some embodiments, e.g. where each of the one or more incompressible fluid(s) may be subject to treatment and/or separation downstream of enclosure 110, it may be considered preferable to reduce or minimize the number of different incompressible fluid(s) used.

In the illustrated example, enclosure 110 also includes an optional incompressible fluid distribution assembly 135. Distribution assembly 135 may include one or more discharge points, manifolds, diffusers, vanes, and/or fluid perforators, and is preferably configured to promote a uniform distribution of incompressible fluid(s) into processing chamber 120.

Distribution assembly 135 may be secured in fixed relation to enclosure 110 and/or processing chamber 120. For example, distribution assembly 135 may be integrally formed with enclosure 110 and/or processing chamber 120. Alternatively, it may be movable relative to enclosure 110 and/or processing chamber 120. For example, distribution assembly 135 may be movable closer to and/or further from solid material 10, allowing the distance between the distribution assembly and the solid material to be selectively varied, e.g. to maintain a predetermined distance between the distribution assembly and the solid material during a treatment operation. Providing and/or maintaining a predetermined distance or 'head space' above solid material 10 may promote the intermixing of the incompressible and compressible fluid(s), and/or it may promote an even distribution of fluids across all of the cross-sectional area of enclosure 110.

Enclosure 110 also includes a plurality of compressible fluid inlets 142, through which one or more incompressible fluid(s) may be drawn into the processing chamber 120. The number and/or configuration of the incompressible fluid inlets 142 may be selected based on one or more characteristics of the solid material and/or contaminants to be removed.

In the illustrated example, a plurality of compressible fluid inlets 142a are provided upstream or above the processing chamber 120, and another plurality of compressible fluid inlets 142b are provided within the processing chamber 120. Providing compressible fluid inlets 142b within the processing chamber 120 may allow for the introduction of one or more treatment additives (e.g. dispersants, detergents, and anti-foaming agents) into processing chamber 120 downstream of incompressible fluid inlets 132 and/or downstream of distribution assembly 135. For example, an aerosol of particles of one or more treatment additives dispersed or suspended in compressible fluid(s) may be introduced via compressible fluid inlets 142b. In some embodiments, compressible fluid inlets 142b may comprise an atomizer nozzle, an electrospray, or other suitable apparatus to generate the aerosol of particles of one or more treatment additives and compressible fluid(s). Preferably, compressible fluid inlets 142b are positioned above the level of solid material 10, to promote intermixing and/or an even distribution of the treatment additive(s) prior to their contact with solid material 10.

In the illustrated example, enclosure 110 also includes an optional compressible fluid distribution assembly 145. Distribution assembly 145 may include one or more discharge points, manifolds, diffusers, vanes, and/or fluid perforators, and is preferably configured to promote a uniform distribution of compressible fluid(s) into processing chamber 120.

In some examples, a single distribution assembly may be provided to promote a uniform distribution of both compressible and incompressible fluid(s) into processing chamber 120. Preferably the compressible and incompressible fluid(s) entering enclosure 110 are evenly distributed across the cross section of enclosure 110 at and/or before they contact solid material 10.

Preferably, incompressible fluid inlets 132, compressible fluid inlets 142, incompressible fluid distribution assembly 135, and compressible fluid distribution assembly 145 are positioned such that the direction of fluid flow into processing chamber 120 is generally parallel to the intended fluid flow direction through the solid material 10, to promote and preferably maximize initial penetration of fluids through the streamline passages, and to inhibit and preferably prevent the loss of any resultant kinetic energy through the obstruction of the intended fluid flow.

Enclosure 110 also includes a plurality of discharge outlets 162, through which compressible and incompressible fluid(s) may be drawn from or otherwise exit processing chamber 120. Providing a plurality of discharge outlets may promote a more even movement of the compressible and incompressible fluid(s) through the entire mass or pile of solid material 10, and/or may promote movement of the compressible and incompressible fluid(s) through the entire cross-sectional area of the bottom of the pile of solid material 10. The number and/or configuration of discharge outlets 162 may be selected based on e.g. the cross-sectional area of the bottom of enclosure 110, and/or the density of the fragments of solid material 10 (e.g. the expected total cross-sectional area of the fluid flow paths within the solid material).

In the illustrated example, discharge outlets 162 are in communication (e.g. via a manifold) with an enclosure outlet 165. Enclosure outlet 165 is in fluid communication with a negative pressure source (e.g. a vacuum generator) for inducing flow of the incompressible fluid(s) through the processing chamber 120. In the example illustrated in FIG. 2, the source of negative pressure for enclosure 110 is depicted as a venturi driven side stream 170.

The negative pressure source is preferably a vacuum generator, such as a turbine, or any other mechanical device. Preferably, the fluid used in the vacuum system is the same as the compressible fluid(s) used operation, although this need not be the case. For example, fluid in the venturi driven side stream 170 may be the same or different than compressible fluid(s) exiting enclosure outlet 165. Alternatively, or additionally, negative pressure may be induced by expanding and/or contracting volumes of gases.

In order to create a desired pressure at the enclosure outlet 165, the negative pressure source may include two or more vacuum generators, arranged in series and/or in parallel. Where multiple vacuum generators are provided, they may be of the same type or a different type.

If there is insufficient fluid flow through the processing chamber 120, this may result in one or more of the vacuum generators operating with no flow through a centrifugal pump, a condition known as 'dead-heading'. Accordingly, it is important that at least some of the one or more compressible fluids be introduced upstream of the enclosure outlet 165 and the vacuum source (e.g. via compressible fluid inlets 142, and/or via one or more relief valves (not shown)).

During operation, the volume and flow rate of the one or more compressible fluids $F_c$, the one or more incompressible fluids $F_{in}$, and/or the negative pressure source may be regulated to promote a desired negative pressure environment in the enclosure 110. In some applications, it may be preferable to provide a near-zero pressure at enclosure outlet 165 to promote a high (e.g. sonic or supersonic) compressible fluid flow velocity.

For example, compressible fluid inlets 142 and/or compressible fluid distribution assembly 145 may be selectively adjustable, and/or one or more controllable valves may be positioned upstream of compressible fluid inlets 142 and/or compressible fluid distribution assembly 145. Similarly, incompressible fluid inlets 132 and/or incompressible fluid distribution assembly 135 may be selectively adjustable, and/or one or more controllable valves may be positioned upstream of incompressible fluid inlets 132 and/or incompressible fluid distribution assembly 135.

During operation, the volume and/or flow rate of the one or more compressible fluids $F_c$ and the one or more incompressible fluids $F_{in}$ are preferably regulated to promote contact between the one or more incompressible fluids and most or preferably all of the surfaces of the solid material to be treated. For example, it may be desirable to avoid voids within the solid material fragments through which there is no incompressible fluid flow. For example, the volume and/or flow rate of the compressible and incompressible fluid(s) are preferably regulated to inhibit or avoid compressing the solid material 10 being treated, as this may limit the number of fluid flow paths within the solid material (e.g. streamlines or flow lines 20, 30) illustrated schematically in FIG. 1.

Preferably, the ratio of the one or more compressible fluids and the one or more incompressible fluids may be selected to avoid voids within the solid material fragments, and otherwise promote incompressible fluid flow over most or preferably all of the surfaces of the solid material to be treated. For example, increasing the relative amount of the one or more compressible fluids may increase the velocity of the incompressible fluid, which in turn may promote incompressible fluid penetration into most or preferably all of the fluid flow paths within the solid material. As another example, increasing the relative amount of the one or more incompressible fluids may increase the amount of compressible fluid required to promote incompressible fluid penetration into most or preferably all of the fluid flow paths within the solid material.

To achieve desired interactions (such as those illustrated schematically in FIG. 1) between the solid material, the surface contaminant(s) to be removed, and the compressible and incompressible fluid flows, the incompressible fluid(s) should be sufficiently dispersed, suspended, or otherwise entrained within the compressible fluid(s) flow, e.g. to promote flow of incompressible fluid(s) through most or preferably all of the fluid flow paths within the solid material (e.g. streamlines or flow lines 20, 30 illustrated schematically in FIG. 1). Suitable flow conditions may be achieved by regulating the volume and/or flow rate of the one or more compressible fluids $F_c$ and the one or more incompressible fluids $F_{in}$ so that the mass (volumetric density) of the compressible fluid(s) and the incompressible fluid(s) are similar.

It will be appreciated that process conditions for a treatment process may depend on the characteristics of the compressible and incompressible fluid(s), the fragment size/density of the solid material 10, the surface friction between the incompressible fluid(s) and the surfaces of the solid material 10, the characteristics of the contaminant(s), and/or the geometry of enclosure 110 and/or processing chamber 120. It will be appreciated that suitable volume and/or flow rates for the one or more compressible fluids $F_c$ and the one or more incompressible fluids $F_{in}$ may need to be determined for a particular treatment process.

Figure 3:
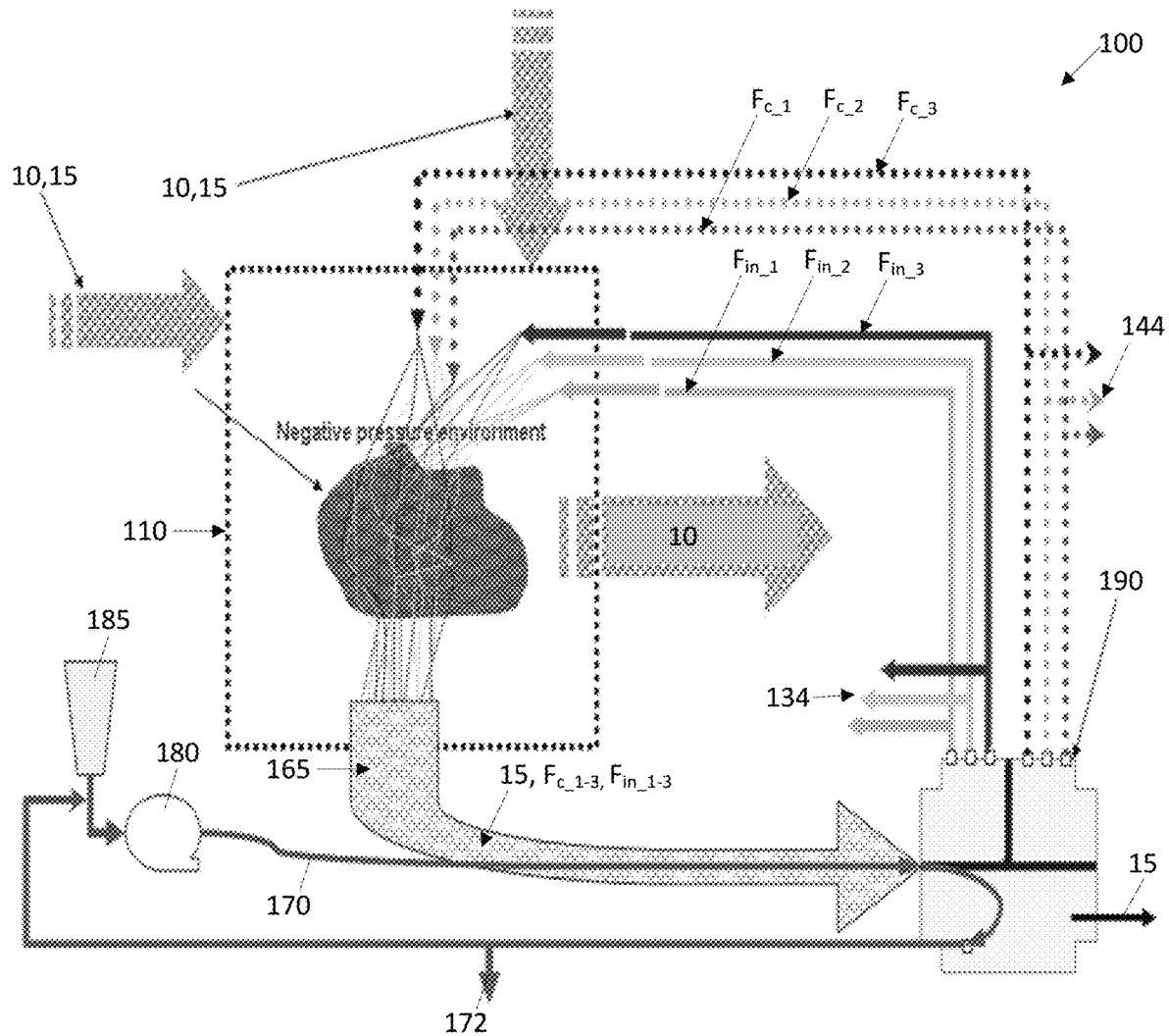
FIG. 3 is a schematic diagram of an enclosure that may be used in the system of FIG. 2 or 4.

FIG. 3 illustrates a schematic example of system and process flow for processing solid material, referred to generally as 100. The system includes an enclosure 110, into which solid material to be treated (e.g. solid material 10 that includes contaminant(s) 15) is introduced. The contaminated solid material 10, 15 may be introduced and processed in batches, or it may be continuously introduced (e.g. via a closed or semi-closed conveyor system or the like). Treated (e.g. cleaned) solid material 10 may be removed from enclosure 110 in batches, or it may be continuously removed (e.g. via a closed or semi-enclosed conveyor system or the like).

In the illustrated example, the source of negative pressure for enclosure 110 is depicted as a venturi driven side stream 170. The illustrated sidestream 170 is generated using vacuum generator 180. A reservoir 185 is shown upstream of vacuum generator 180. Reservoir 185 is a source of compressible vacuum fluid used to generate sidestream 170, and thereby induce negative pressure at enclosure outlet 165/within enclosure 110. In some embodiments, the compressible vacuum fluid used to generate sidestream 170 may be regenerated and/or re-supplied to reservoir 185, e.g. after exiting via an outlet 172.

In operation, compressible fluids $F_c$, incompressible fluids $F_{in}$, and any entrained contaminant(s) 15 are induced to exit enclosure 110 via enclosure outlet 165. After exiting enclosure outlet 165, the mixture is preferably separated. In the illustrated example, a processing fluid regenerator 190 (and/or other discharge processors) is provided to separate the compressible fluids $F_c$, the incompressible fluids $F_{in}$, and contaminant(s) 15.

It will be appreciated that downstream treatment of the discharged fluids and contaminant(s) may be effected using any suitable treatment process or practice knpown in the art. For example, treatment of fluids exiting chamber 110 and/or removed contaminants 15 may include removal or conditioning, land filling, recycling, reusing, regeneration, and and/or fuel generation of any or all materials 15 from the process or fluids exiting discharge points 134, 144, or the like.

In the illustrated example, system 100 may be operated as a 'closed loop' system, in which the fluids can be reconditioned and re-used in the process. For example, as shown schematically, the compressible fluids $F_c$ (in the illustrated example three compressible fluids $F_{c\_1}$, $F_{c\_2}$, and $F_{c\_3}$ are shown) and the incompressible fluids $F_{in}$ (in the illustrated example three incompressible fluids $F_{in\_1}$, $F_{in\_2}$, and $F_{in\_3}$ are shown) may be separated and re-injected (which may be characterized as regenerated) into enclosure 110. Optionally, one or more compressible fluids $F_c$ may be removed from the system via outlets 144, and one or more incompressible fluids $F_{in}$ may be removed from the system via outlets 134.

As used herein 'regenerated' or 'a regeneration process' refers to the reconditioning, separation, recycling, or discharge of the downstream fluids (compressible or incompressible) for reuse during operation of system 100.

It will be appreciated that a system 100 may include one or more enclosures 110, which may be arranged in parallel or in series.

In some examples, contaminated solid material 10, 15 may be pre-treated prior to being processed using compressible and incompressible fluid(s) applied under negative pressure. For example, contaminated solid material 10, 15 may be comminuted or otherwise physically processed to reduce an average fragment or particle size of the solid material 10. Additionally, or alternatively, the contaminated solid material 10, 15 may be heated or cooled. Additionally, or alternatively, the contaminated solid material 10, 15 may be exposed to one or more chemical solvents. It will be appreciated that one or more pre-treatment steps may be performed on contaminated solid material 10, 15 within enclosure 110, or prior to its introduction to enclosure 110.

In some examples, processed solid material 10 may be subjected to one or more post-treatment steps after it has been processed using compressible and incompressible fluid(s) applied under negative pressure. For example, solid material 10 may be heated, cooled, dried, wetted, and/or exposed to one or more chemical solvents. It will be appreciated that one or more post-treatment steps may be performed on solid material 10 within enclosure 110, or after it has been removed from enclosure 110.

Systems and methods disclosed herein may be particularly useful for stripping or washing solid material to separate contaminants from surfaces of the solid material. A particular example is the removal of oil or other petroleum products from material such as used oil containers (e.g. plastic motor-oil containers), used oil filters (e.g. from motor vehicles) and the like.

Figure 4:
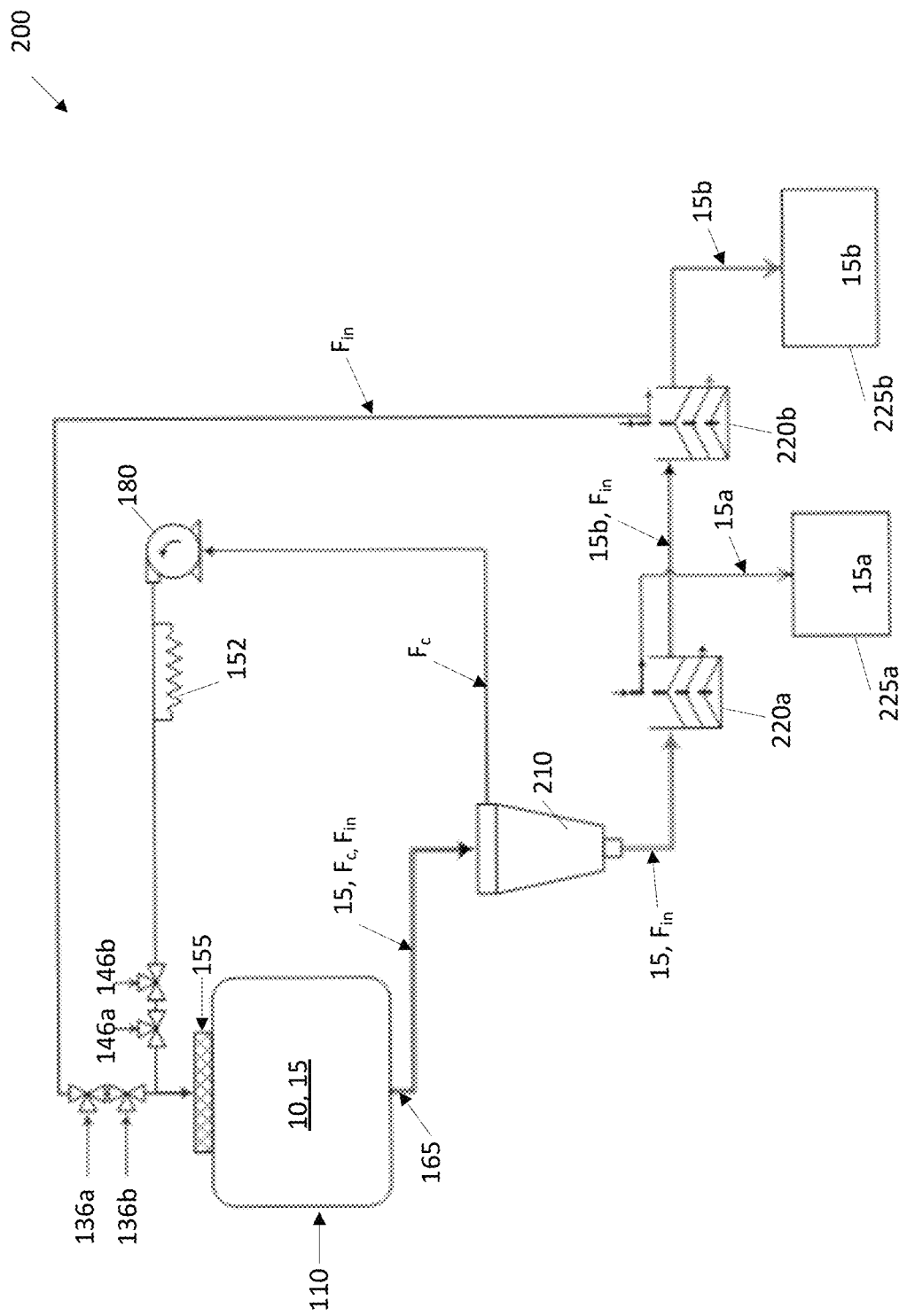
FIG. 4 is a schematic diagram of a system and process flow for removing contaminants from surfaces of a solid material, in accordance with one embodiment.

FIG. 4 illustrates a schematic example of a system and process flow, referred to generally as 200, for processing used oil filters and/or oil-coated plastics for subsequent recycling. Specifically, used oil filters (e.g. canister oil filters) may be processed to extract any oil and particulates entrapped and entrained within the used oil filters.

Typical canister filters include metal elements, fibrous filter media, and rubber components (e.g. check valve and seals). The described system and process flow may be used to remove contaminants (including e.g. oil and particulates captured during the operation of the filter) and render the solid components of used oil filters substantially 'clean' (e.g. free of oil and other impurities). For example, more than 90%, more than 95%, or about 99% of particulate and/or other solid contaminants (by weight), and more than 90%, more than 95%, or about 99% of oil and/or other liquid contaminants (by volume) may be removed from surfaces of the solid components of the used filter canisters.

First, the material to be treated (e.g. used oil filters) is comminuted using a shredder or the like prior to being introduced to enclosure 110. Reducing the size of the solid material fragments prior to treatment may have one or more advantages. For example, comminuting or otherwise breaking down the used oil filters may facilitate the removal of free oil and contaminants from the filter canisters that was entrapped by the filter's check valve system. Also, the size reduction process may promote the creation of path lines and streamlines necessary for the subsequent processing using compressible and incompressible fluid(s) applied under negative pressure to achieve the desired removal performance.

In the illustrated example, one or more compressible fluids $F_c$ and one or more incompressible fluids $F_{in}$ are introduced into an upper or upstream end of enclosure 110 via a common distribution assembly 155. Distribution assembly 155 promotes the uniform and consistent introduction of compressible and incompressible fluids into the processing chamber of the enclosure 110.

In the illustrated example, a cyclonic separator 210 is positioned downstream of enclosure outlet 165. A vacuum generator 180 (e.g. a turbine vacuum generator) is positioned downstream of a fluid outlet of the cyclonic separator 210. In operation, vacuum generator 180 draws compressible fluid $F_c$ from cyclonic separator 210, which in turn induces compressible fluid $F_c$ (and entrained incompressible fluid $F_{in}$ and contaminants 15) to flow from enclosure outlet 165 into cyclonic separator 210.

Compressible fluid $F_c$ exiting vacuum generator 180 is directed to the common distribution assembly 155. Accordingly, in use compressible fluid $F_c$ circulates in a closed loop that includes enclosure 110, cyclonic separator 210, vacuum generator 180, and conduits provided to direct fluid flow therebetween.

In the illustrated example, compressible fluid $F_c$ is directed through control valves 146a, 146b before entering common distribution assembly 155. Control valves 146a, 146b may be used to regulate the flow rate of compressible fluid $F_c$ into enclosure 110. It will be appreciated that more or fewer control valves 146 may be provided in one or more alternative embodiments.

In the illustrated example, the compressible process fluid $F_c$ (which is also compressible vacuum fluid supply) is ambient air. One or more local flow rates of the compressible fluid $F_c$ are preferably monitored (e.g. via one or more flow rate sensors) and controlled (e.g. via control valves 146a, 146b or other fluid control devices) to inhibit and preferably prevent vacuum 'dead heading' from occurring.

In the illustrated example, a heat transfer device 152 (such as a heat exchanger or the like) is provided to transfer heat to or from the compressible fluid $F_c$ downstream of the vacuum generator 180. Being able to vary the temperature of compressible fluid $F_c$ may have one or more advantages. For example, compressible fluid $F_c$ may be heated or cooled to affect the fluid pressure in the conduit between vacuum generator 180 and control valve 146b. Also, heat may be extracted from compressible fluid $F_c$ to be utilized as an energy source, e.g. to further process solid material 10 that has been freed of contaminants 15. For example, the heat generated can be used to promote the of processed solid material 10, and/or for any other pre- or post-treatment process.

As illustrated in FIG. 4, a first centrifuge separator 220a is positioned downstream of cyclonic separator 210. In operation, centrifuge separator 220a separates first contaminant(s) 15a (e.g. oil having a viscosity within a first range and/or entrained particulates) from the mixture of incompressible fluid $F_{in}$ and contaminants 15 that exit cyclonic separator 210. The separated first contaminant(s) 15a may be drawn off into a first contaminant vessel 225a.

A second centrifuge separator 220b is positioned downstream of first centrifuge separator 220a. In operation, centrifuge separator 220b separates second contaminant(s) 15b (e.g. oil having a viscosity within a second range and/or entrained particulates) from the mixture of incompressible fluid $F_{in}$ and contaminants 15b that exit first centrifuge separator 220a. The separated second contaminant(s) 15b may be drawn off into a second contaminant vessel 225a.

Collected contaminants 15a, 15b may be consolidated, further separated, and/or further treated with conventional techniques prior to delivery to an intended collection system. (e.g. a recycling center, a plastics processing plant, or the like).

While two separators 220a, 220b are shown in the illustrated example, it will be appreciated that in alternative embodiments, three or more separators may be provided, or only a single separator may be provided. Also, while separators 220a, 220b in the illustrated example are centrifuge separators, it will be appreciated that separators of any suitable design may be used.

Incompressible fluid $F_{in}$ exiting second centrifuge separator 220b is directed to the common distribution assembly 155. Accordingly, in use incompressible fluid $F_{in}$ circulates in a closed loop that includes enclosure 110, cyclonic separator 210, separators 220a, 220b, and conduits provided to direct fluid flow therebetween.

In the illustrated example, incompressible fluid $F_{in}$ is directed through control valves 136a, 136b before entering common distribution assembly 155. Control valves 136a, 136b may be used to regulate the flow rate of incompressible fluid $F_{in}$ into enclosure 110. It will be appreciated that more or fewer control valves 136 may be provided in one or more alternative embodiments.

In the illustrated example, the incompressible process fluid $F_{in}$ is water. Optionally, one or more additives (e.g. chemical surfactants) may be mixed with the water. One or more local flow rates of the incompressible fluid $F_{in}$ are preferably monitored (e.g. via one or more flow rate sensors) and controlled (e.g. via control valves 146a, 146b or other fluid control devices) during a treatment process.

Optionally, a heat transfer device (such as a heat exchanger or the like) may be provided to transfer heat to or from the incompressible fluid $F_{in}$ downstream of separators 220a, 220b. Being able to vary the temperature of incompressible fluid $F_{in}$ may have one or more advantages. For example, heat may be extracted from incompressible fluid $F_{in}$ to be utilized as an energy source, e.g. to further process solid material 10 that has been freed of contaminants 15.

Optionally, the cleaned solid material 10 may be separated using conventional techniques, so that three solid material commodity streams (e.g. steel, rubber, and filter media) are created for recycling, incineration, and/or further processing.

In addition to processing used oil filters and/or oil-coated plastics for subsequent recycling, systems and methods disclosed herein may be used for purging solid materials of contaminants, surface treatment of solid material with all forms of fluids, aeration of solid material (mixed or homogeneous), agitation of fluids of differing properties (mass, density, etc.) and fluids/solids mixtures, particulate separation, classification, emulsification, and hydration of fluids and solid material within an enclosure.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A system for removing contaminants from surfaces of a solid material, the system comprising:
    a processing enclosure defining a processing chamber, the processing enclosure including an inlet fluid distribution manifold and a discharge outlet;
    a cyclonic separation stage configured to remove compressible fluid from a discharge stream obtained from the processing chamber;
    a primary discharge flow path extending from the discharge outlet of the processing enclosure to the cyclonic separation stage;
    a first return flow path extending from the cyclonic separation stage to the inlet fluid distribution manifold;
    a vacuum pump positioned in the first return flow path between a compressible fluid outlet of the cyclonic separation stage and the inlet fluid distribution manifold;
    a first centrifugal separation stage configured to remove insoluble solids from a discharge stream obtained from the cyclonic separation stage;
    a secondary discharge flow path extending from the first centrifugal separation stage to the centrifugal separation stage;
    a second centrifugal separation stage configured to remove incompressible fluid from a discharge stream obtained from the first centrifugal separation stage;
    a tertiary discharge flow path extending from the first centrifugal separation stage to the second centrifugal separation stage; and
    a second return flow path extending from the second centrifugal separation stage to the inlet fluid distribution manifold.

2. The system of claim 1, further comprising a heat source configured to transfer thermal energy to compressible fluid flowing through the first return flow path downstream of the vacuum pump.

3. The system of claim 2, wherein the heat source comprises at least one of a coil heat exchanger and a shell and tube heat exchanger.

4. The system of claim 1, wherein the vacuum pump comprises at least one vacuum turbine.

5. The system of claim 1, further comprising a discharge manifold positioned between the processing chamber and the discharge outlet.

6. The system of claim 1, wherein at least one wall of the processing enclosure that defines the processing chamber is collapsible, such that the volume of the processing chamber may be varied.

7. The system of claim 1, further comprising at least one barrier positioned within the processing chamber to inhibit or prevent motion of the solid material.

8. The system of claim 7, wherein the at least one barrier comprises at least one classifier.

9. The system of claim 1, wherein the inlet fluid distribution manifold comprises a plurality of compressible fluid discharge points and a plurality of incompressible fluid discharge points.

10. The system of claim 9, wherein the plurality of compressible fluid discharge points comprise compressible fluid valves.

11. The system of claim 9, wherein the plurality of compressible fluid discharge points comprise compressible fluid diffusers.

12. The system of claim 9, wherein the plurality of incompressible fluid discharge points comprise incompressible fluid valves.

13. The system of claim 9, wherein the plurality of incompressible fluid discharge points comprise incompressible fluid diffusers.

14. The system of claim 9, wherein the inlet fluid distribution manifold further comprises one or more vanes to direct compressible fluid entering the processing chamber.

15. The system of claim 9, wherein the inlet fluid distribution manifold further comprises one or more vanes to direct incompressible fluid entering the processing chamber.

* * * * *